United States Patent
Muruganathan et al.

(10) Patent No.: US 11,489,618 B2
(45) Date of Patent: Nov. 1, 2022

(54) RATE MATCHING

(71) Applicant: Telefonaktiebolaget LM Ericsson (publ), Stockholm (SE)

(72) Inventors: Siva Muruganathan, Stittsville (CA); Shiwei Gao, Nepean (CA); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 348 days.

(21) Appl. No.: 16/335,175

(22) PCT Filed: Sep. 28, 2017

(86) PCT No.: PCT/SE2017/050948
§ 371 (c)(1),
(2) Date: Mar. 20, 2019

(87) PCT Pub. No.: WO2018/063072
PCT Pub. Date: Apr. 5, 2018

(65) Prior Publication Data
US 2019/0280803 A1      Sep. 12, 2019

Related U.S. Application Data

(60) Provisional application No. 62/402,476, filed on Sep. 30, 2016.

(51) Int. Cl.
*H04L 1/00* (2006.01)
*H04L 5/00* (2006.01)
*H04W 72/04* (2009.01)

(52) U.S. Cl.
CPC .......... *H04L 1/0013* (2013.01); *H04L 1/0026* (2013.01); *H04L 5/005* (2013.01);
(Continued)

(58) Field of Classification Search
CPC ... H04W 72/04; H04W 28/04; H04W 72/005; H04L 5/0048; H04L 5/005; H04L 1/0067; H04L 5/0051; H04L 1/0013
See application file for complete search history.

(56) References Cited

U.S. PATENT DOCUMENTS

2014/0126496 A1   5/2014   Sayana et al.
2014/0233407 A1*  8/2014   Pourahmadi .......... H04L 5/0051
                                                 370/252
(Continued)

OTHER PUBLICATIONS

Unknown, Author, "Discussion on efficient utilization of BF CSI-RS", 3GPP TSG RAN WG1 Meeting #85, R1-164858, Nanjing, China, May 23-27, 2016, 1-5.

(Continued)

*Primary Examiner* — Faruk Hamza
*Assistant Examiner* — Aixa A Guadalupe Cruz
(74) *Attorney, Agent, or Firm* — Murphy, Bilak & Homiller, PLLC

(57) ABSTRACT

A method for facilitating Physical Downlink Shared Channel, PDSCH, rate matching is presented. The method is performed in a network node (2) and comprises sending (102) to a wireless device (1) an indication whether a group of all available resources of an aperiodic Channel State Information Reference Signal, CSI-RS, resource pool is used in a given subframe, wherein the sending (102) comprises transmitting, to a wireless device in transmission mode 9, a Downlink Control Information, DCI, format 2C message, in values of two additional bits representing a determined use of CSI-RS resources.

16 Claims, 7 Drawing Sheets

(52) U.S. Cl.
CPC .......... *H04L 5/0044* (2013.01); *H04L 5/0055* (2013.01); *H04L 5/0057* (2013.01); *H04W 72/042* (2013.01); *H04L 1/0067* (2013.01)

(56) References Cited

U.S. PATENT DOCUMENTS

| | | | | |
|---|---|---|---|---|
| 2016/0135143 | A1* | 5/2016 | Won | H04W 12/08 370/312 |
| 2016/0227548 | A1 | 8/2016 | Nimbalker et al. | |
| 2018/0175983 | A1* | 6/2018 | Yum | H04L 5/14 |
| 2019/0215096 | A1* | 7/2019 | Kim | H04L 5/00 |

OTHER PUBLICATIONS

Unknown, Author, "Further discussion on beamformed CSI-RS designs for eFD-MIMO", 3GPP TSG RAN WG1 Meeting #86, R1-166578, Gothenburg, Sweden, Aug. 22-26, 2016, 1-6.

3GPP, "3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.2.0, Jun. 2016, 1-91.

3GPP, "3rd Generation Partnership Project; Technical Specification Group Radio Access Network; Evolved Universal Terrestrial Radio Access (E-UTRA); Multiplexing and channel coding (Release 13)", 3GPP TS 36.212 V13.0.0, Dec. 2015, 1-121.

3GPP, "3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, 1-141.

3GPP, "3rd Generation Partnership Project; Technical Specification Group Radio Access Network; Evolved Universal Terrestrial Radio Access (E-UTRA); Physical layer procedures (Release 13)", 3GPP TS 36.213 V13.0.0, Dec. 2015, 1-6.

Unknown, Author, "RAN1 Chairman's Notes", 3GPP TSG RAN WG1 Meeting #86, Gothenburg, Sweden, Aug. 22-26, 2016, 1-105.

Unknown, Author, "Rate matching enhancements for aperiodic CSI-RS in different transmission mode", 3GPP TSG RAN WG1 Meeting #86, R1-167138, Göteborg, Sweden, Aug. 22-26, 2016, 1-5.

Unknown, Author, "Remaining details on beamformed CSI-RS enhancements", 3GPP TSG RAN WG1 Meeting #86, R1-166841, Gothenburg, Sweden, Aug. 22-26, 2016, 1-5.

Unknown, Author, "UE specific Beamforming with Aperiodic CSI-RS Transmission", 3GPP TSG-RAN WG1 #86, R1-167637, Gothenburg, Sweden, Aug. 22-26, 2016, 1-6.

Unknown, Author, "Remaining details of Downlink Control Signalling for CoMP", 3GPP TSG RAN WG1 Meeting #70bis, R1-124408, San Diego, US, Oct. 8-12, 2012, 1-6.

* cited by examiner

RATE MATCHING

TECHNICAL FIELD

The invention relates to a method for Physical Downlink Shared Channel (PDSCH) rate matching, a network node, a wireless device, a computer program and a computer program product thereof.

BACKGROUND

Long-Term Evolution (LTE) uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 2, where each resource element corresponds to one OFDM subcarrier during one OFDM symbol interval. [3GPP TS 36.211 Technical Specification Group Radio Access Network; Evolved Universal Terrestrial Radio Access (E-UTRA); Physical channels and modulation (Release 13); V13.0.0 (2016 January)]

In the time domain, LTE downlink transmissions are organized into radio frames of 10 ms, each radio frame consisting of ten equally-sized subframes of length $T_{subframe}=1$ ms as shown in FIG. 3.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

Downlink transmissions are dynamically scheduled, i.e., in each subframe the base station transmits control information about to which terminals data is transmitted and upon which resource blocks the data is transmitted, in the current downlink subframe. This control signalling is typically transmitted in the first 1, 2, 3 or 4 OFDM symbols in each subframe. A downlink system with 3 OFDM symbols as control is illustrated in FIG. 4.

Physical Channels and Transmission Modes

In LTE, a number of physical DL channels are supported. A downlink physical channel corresponds to a set of resource elements carrying information originating from higher layers. The following are some of the physical channels supported in LTE:

Physical Downlink Shared Channel, PDSCH
Physical Downlink Control Channel, PDCCH
Enhanced Physical Downlink Control Channel, EPDCCH PDSCH is used mainly for carrying user traffic data and higher layer messages. PDSCH is transmitted in a DL subframe outside of the control region as shown in FIG. 4. Both PDCCH and EPDCCH are used to carry Downlink (DL) Control Information (DCI) such as Physical Resource Block (PRB) allocation, modulation level and coding scheme (MCS), precoder used at the transmitter, and etc. PDCCH is transmitted in the first one to four OFDM symbols in a DL subframe, i.e. the control region, while EPDCCH is transmitted in the same region as PDSCH.

Similarly, the following physical UL channels are supported:

Physical Uplink Shared Channel, PUSCH
Physical Uplink Control Channel, PUCCH

Different DCI formats are defined in LTE for DL and UL data scheduling. For example, DCI formats 0 and 4 are used for UL data scheduling while DCI formats 1, 1A, 1B, 1C, 1D, 2, 2A, 2B, 2C, 2D [3GPP TS 36.212 Technical Specification Group Radio Access Network; Evolved Universal Terrestrial Radio Access (E-UTRA); Multiplexing and channel coding (Release 13); V13.0.0 (2016 January)] are used for DL data scheduling. In DL, which DCI format is used for data scheduling is associated with a DL transmission scheme and/or the type of message to be transmitted. The following are some of the transmission schemes supported in LTE.

Single-antenna port
Transmit diversity (TxD)
Open-loop spatial multiplexing
Close-loop spatial multiplexing
Up to 8 layer transmission PDCCH is always transmitted with either the single-antenna port or Transmit Diversity scheme while PDSCH can use any one of the transmission schemes. In LTE, a User Equipment (UE) is configured with a transmission mode (TM), rather than a transmission scheme. There are 10 TMs, i.e. TM1 to TM10, defined so far for PDSCH in LTE. Each TM defines a primary transmission scheme and a backup transmission scheme. The backup transmission scheme is either single antenna port or TxD. Following is a list of some primary transmission schemes in LTE:

TM1: single antenna port, port 0
TM2: TxD
TM3: open-loop SM
TM4: close-loop SM
TM9: up to 8 layer transmission, port 7-14
TM10: up to 8 layer transmission, port 7-14

In TM1 to TM6, cell specific reference signal (CRS) is used as the reference signal for both channel state information feedback and for demodulation at a UE. While in TM7 to TM10, UE specific demodulation reference signal (DMRS) is used as the reference signal for demodulation.

Channel State Information Reference Signal (CSI-RS)

In LTE Release-10, a new channel state information reference signal (CSI-RS) was introduced for the intent to estimate channel state information. The CSI-RS based CSI feedback provides several advantages over the CRS based CSI feedback used in previous releases. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a UE specific manner).

Two types of CSI-RS are defined in LTE: non-zero power (NZP) CSI-RS and zero power (ZP) CSI-RS. NZP CSI-RS is transmitted by a network node (or eNB) for UEs to estimate the downlink channels to the network node. While for ZP CSI-RS, one or more CSI-RS resource(s) is/are allocated by the network node but nothing is transmitted on the resources, which can be used to reduce interferences to neighbour cells so that better channel estimation can be performed by the UEs in the neighbour cells.

For a Rel-13 UE, the number of supported antenna ports are 1, 2, 4, 8, 12, 16. In Rel-14, the antenna port numbers have been increased to include 20, 24, 28, 32 ports. FIG. 5 shows the REs available for CSI-RS allocations in a PRB. Up to 40 REs can be configured for CSI-RS. CSI-RS is transmitted over all PRBs. Note that CSI-RS signals are transmitted in all RBs of a system bandwidth, so the same resource allocation is repeated in all RBs. In Rel-14 LTE, CSI-RS can also be transmitted with reduced density is supported. That is the CSI-RS signals corresponding to different ports are transmitted in every $N^{th}$ PRB.

CSI-RS is transmitted periodically on certain subframes, also referred to as CSI-RS subframes. A CSI-RS subframe configuration consists of a subframe periodicity and a subframe offset. The periodicity is configurable at 5, 10, 20, 40 and 80 ms. A CSI-RS configuration consists of a CSI-RS resource configuration as specified in Table 6.10.5.2-1 of 3GPP T536.211 and a CSI-RS subframe configuration as specified in Table 6.10.5.3-1 of 3GPP T536.211.

Codebook Based Channel State Information (CSI) Estimation and Feedback

In closed loop multiple-input and multiple-output (MIMO) transmission schemes such as TM9 and TM10, a UE estimates and feeds back the downlink CSI to the eNB. The eNB uses the feedback CSI to transmit downlink data to the UE. The CSI consists of a transmission rank indicator (RI), a precoding matrix indicator (PMI) and a channel quality indicator(s) (CQI). A codebook of precoding matrices is used by the UE to find out the best match between the estimated downlink channel and a precoding matrix in the codebook based on certain criteria, for example, the UE throughput. The channel is estimated based on a Non-Zero Power CSI reference signal (NZP CSI-RS) transmitted in the downlink for TM9 and TM10.

The CQI/RI/PMI together provide the downlink channel state to the UE. This is also referred to as implicit CSI feedback since the estimation of the channel $H_n$ is not fed back directly. The CQI/RI/PMI can be wideband (i.e., the whole transmission band) or sub band (i.e., parts of the whole transmission band) depending on which reporting mode is configured.

In LTE Rel-13, two types of CSI reporting were introduced, i.e. Class A and Class B [3GPP TS 36.213 Technical Specification Group Radio Access Network; Evolved Universal Terrestrial Radio Access (E-UTRA); Physical layer procedures (Release 13); V13.0.1 (2016 January)]. In Class A CSI reporting, a UE measures and reports CSI based on a new codebook for the configured 1D or 2D antenna array with 8, 12 or 16 antenna ports. The CSI consists of a rank indicator (RI), a PMI and a CQI or CQIs, similar to the CSI reporting in pre Rel-13. The Class A CSI reporting is extended to 20, 24, 28 and 32 ports in LTE Rel-14.

In Class B CSI reporting, in one scenario (referred to as "Class B K>1"), multiple (i.e., K>1) CSI-RS resources can be configured for a UE in a single CSI process. Each resource may be for multiple antenna ports (i.e. 1, 2, 4, or 8 ports). Each CSI-RS resource may be associated with a precoded CSI-RS signal. A UE measures downlink CSIs associated with all the CSI-RS resources and selects the best CSI among all the CSIs. The UE then reports back the selected CSI-RS Resource Index (CRI) and the corresponding CSI. In another scenario (also referred to as "Class B K=1"), a UE is configured with one CSI-RS resource, the CSI-RS signals may be precoded or "beamformed" particularly for the UE based on some prior information about the UE such as uplink (UL) measurements. The UE then measures the downlink channel based on the received CSI-RS signals on the CSI-RS resource and feedback the estimated CSI to the eNB based on a new codebook for 2, 4, 8 ports.

CSI Process

In LTE Release ii, the concept of CSI process was introduced such that each CSI process is associated with a NZP CSI-RS resource and a CSI-IM resource. A CSI-IM resource is defined by a ZP CSI-RS resource and a ZP CSI-RS subframe configuration. A UE in TM10 can be configured with one or more (up to four) CSI processes per serving cell by higher layers and each CSI reported by the UE corresponds to a CSI process. Multiple CSI processes were introduced to support Coordinated Multi-Point (COMP) transmission in which a UE measures and feeds back CSI associated with each transmission point (TP) to an eNB. Based on the received CSIs, the eNB may decide to transmit data to the UE from one of the TPs.

CSI Reporting

For CSI reporting, both periodic and aperiodic (i.e. triggered by eNB) reports are supported, known as P-CSI and A-CSI respectively. In a CSI process, a set of CSI-RS ports are configured for which the UE performs measurements. These CSI-RS ports can be configured to be periodically transmitted with 5 ms, 10 ms, 20 ms etc periodicity.

LTE Mechanisms for Control Signalling

LTE control signalling can be carried in a variety of ways, including carrying control information on PDCCH or PUCCH, embedded in the PUSCH, in MAC control elements ('MAC CEs'), or in RRC signalling. Each of these mechanisms is customized to carry a particular kind of control information.

Control information carried on PDCCH, PUCCH, or embedded in PUSCH is physical layer related control information, such as downlink control information (DCI), uplink control information (UCI), as described in 3GPP TS 36.211, 36.212, and 36.213. DCI is generally used to instruct the UE to perform some physical layer function, providing the needed information to perform the function. UCI generally provides the network with needed information, such as HARQ-ACK, scheduling request (SR), channel state information (CSI), including CQI, PMI, RI, and/or CRI. UCI and DCI can be transmitted on a subframe-by-subframe basis, and so are designed to support rapidly varying parameters, including those that can vary with a fast fading radio channel. Because UCI and DCI can be transmitted in every subframe, UCI or DCI corresponding to a given cell tend to be on the order of tens of bits, in order to limit the amount of control overhead.

Control information carried in MAC CEs is carried in MAC headers on the uplink and downlink shared transport channels (UL-SCH and DL-SCH), as described in 3GPP TS 36.321 [3GPP TS 36.321 Technical Specification Group Radio Access Network; Evolved Universal Terrestrial Radio Access (E-UTRA); Medium Access Control (MAC) protocol specification (Release 13); V13.2.0 (2016 June)]. Since a MAC header does not have a fixed size, control information in MAC CEs can be sent when it is needed, and does not necessarily represent a fixed overhead. Furthermore, MAC CEs can carry larger control payloads efficiently, since they are carried in UL-SCH or DL-SCH transport channels, which benefit from link adaptation, HARQ, and can be turbo coded (whereas UCI and DCI can't be in Rel-13). MAC CEs are used to perform repetitive tasks that use a fixed set of parameters, such as maintaining timing advance or buffer status reporting, but these tasks generally do not require transmission of a MAC CE on a subframe-by-subframe basis. Consequently, channel state information related to a fast fading radio channel, such as PMI, CQI, RI, and CRI are not carried in MAC CEs in Rel-13.

Rate Matching

In LTE, a virtual circular buffer is used to match any available code rate by selecting or pruning bits in the buffer. This rate matching is useful since the number of available REs for a UE in a subframe may vary due to the presence or absence of various reference signals. For example, the number of REs for PDSCH in a subframe configured with CSI-RS would be different from that in subframes without CSI-RS. The rate matching can be used to adapt the variations of the available PDSCH REs in this case. Note that in this case, both the eNB and the UE knows the exact number of available PDSCH REs and the RE locations in a RB. This PDSCH to RE mapping information is important for correct PDSCH decoding as otherwise, there could be a mismatch between the REs a PDSCH is transmitted on and the REs over which the PDSCH is received and decoded.

PQI Bits in DCI 2D

In LTE Rel-11, a UE configured in transmission mode 10 for a given serving cell can be configured with up to four parameter sets by higher layer signalling to decode PDSCH according to a detected PDCCH/EPDCCH with DCI format 2D intended for the UE and the given serving cell. This is because eNB may transmit PDSCH to the UE via different transmission points (TPs) at different times based on the channel conditions. There can be different reference signals configured for different TPs. The UE shall use the parameter set according to the value of the 'PDSCH RE Mapping and Quasi-Co-Location indicator' (PQI) field (defined in Table 1, which is extracted from Table 70.1.9-1 in TS 36.213 in the detected PDCCH/EPDCCH with DCI format 2D for determining the correct PDSCH RE mapping. Dynamic point selection (DPS) is a form of coordinated multi-point operation (CoMP) where the data transmission is from a single TP but which TP transmits in a given time can change dynamically.

To support CoMP with DPS where the UE can receive PDSCH, two 'PQI' bits in DCI format 2D are available for dynamic signalling of PDSCH mapping and quasi-co-location (QCL) information. This dynamic signalling targets adjusting transmission parameters and UE QCL assumptions so that they are compatible with the potentially dynamically changing TP from which the PDSCH transmission in DPS originates from.

The QCL information provides the possibility for a UE to exploit CRS and CSI-RS for, in terms of QCL properties, aiding its demodulation of DMRS based PDSCH transmission. QCL properties make clear which properties of the channel may be assumed by the UE to be related between different antenna ports and are for TM10.

The parameters for determining PDSCH RE mapping are configured via higher layer signalling for each parameter set, including Number of CRS ports
CRS FreqShift.
ZP CSI-RS configuration

TABLE 1

PDSCH RE Mapping and Quasi-Co-Location Indicator field in DCI format 2D

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

Puncturing

Puncturing can be another way of dealing with the variations of the available REs when a UE is unaware of the presence of certain reference signals in a subframe. For example, CSI-RS was introduced in LTE Rel-10 and a Rel-8 UE does not understand it. So if a Rel-8 UE is scheduled PDSCH in a subframe configured with CSI-RS, the UE would think that PDSCH is transmitted on the REs that are actually configured with CSI-RS. In this case, the eNB mutes the PDSCH transmission in those REs, or puncture the PDSCH signals in the REs, and the UE treats the received CSI-RS as PDSCH. Of course, the dew coding performance would be degraded. However, as long as the number of REs are small, the degradation can still be acceptable.

Aperiodic CSI-RS

The 3GPP RAN1 #86 meeting agreed to introduce aperiodic CSI-RS, in which only CSI-RS resource would be configured for a UE and unlike in the conventional CSI-RS configuration, there would not be any subframe configuration associated with it. It was agreed that a new "Aperiodic CSI-RS-Resource-Config IE" was to be defined in the Radio Resource Control (RRC) configuration. It was further agreed that a UE could be preconfigured with $K \in \{1, 2, \ldots, 8\}$ CSI-RS resources.

One of the motivations for aperiodic CSI-RS is that the transmission of CSI-RS can occur in any subframe in order for a UE to measure and feedback downlink CSI, and it does not have to be limited to a set of preconfigured subframes. Another motivation is to be able to reduce CSI-RS overhead in the presence of a large number of UEs. For instance, if a large number of UEs are present, allocated periodic CSI-RS resources to each UE in a UE-specific manner will consume a large number of REs and will drive the CSI-RS overhead up. The CSI-RS overhead can be reduced by aperiodic CSI-RS with a pool of CSI-RS resources where the pool can contain a maximum of K resources. The CSI-RS resource pool containing multiple CSI-RS resources can be shared among a group of UEs in which precoded or beamformed CSI-RS for targeting different UEs can be transmitted at different subframes by sharing the common CSI-RS resource pool. The presence of CSI-RS and CSI measurement request can be dynamically triggered in DCI such as an uplink data grant message to the targeted UEs for CSI measurement and report. An example is shown in FIG. 6. In the dynamic aperiodic CSI-RS indication, the UE is told to measure CSI in the subframe it receives the indication and on which one of the preconfigured CSI-RS resources it should measure CSI on. The UE measures CSI on the indicated CSI-RS resource and feeds back the CSI to the UE.

In some cases, not all K preconfigured CSI-RS resource may be needed for instance if the load is varying. Hence, in this case a number N<K of CSI-RS resources may be activated in a more dynamic way to cope with the varying load in the system. If N among the K CSI-RS resources are activated in the UE, the UE can expect to receive aperiodic CSI-RS in one of the N activated CSI-RS resources. The activation of N out of K resources can be done via MAC CE or DCI signalling.

One issue with this aperiodic CSI-RS transmission is how to inform a UE scheduled with PDSCH in a subframe about the aperiodic CSI-RS transmission to another UE in order to determine the correct PDSCH RE mapping in the subframe, or correct PDSCH rate matching. The issue has been recognized and a number of possible solutions have been proposed [Chairman's notes, 3GPP RAN1 #86, section 70.2.4.1.2, Aug. 22-26, 2016. Gothenburg, Sweden] as follows:

Alternative 1: Aperiodic ZP CSIRS, dynamically indicated by a new common DCI. The common DCI is monitored in common search space.

Alternative 2: Aperiodic ZP CSIRS, aperiodic ZP CSI-RS resource signalling field is introduced in DL DCIs for all TMs.

Alternative 3: Use the existing PQI states or increase the number of PQI states for TM10; no PDSCH RM solution for other TMs. In this case, aperiodic ZP CSIRS resource is not defined.

SUMMARY

An object of embodiments presented herein is to ensure low control signalling overhead for rate matching.

According to a first aspect there is presented a method for facilitating PDSCH rate matching. The method is performed in a network node and comprises sending to a wireless device an indication whether a group of all available resources of an aperiodic CSI-RS resource pool is used in a given subframe. The sending may comprise transmitting, to a wireless device in transmission mode 9, a Downlink Control Information, DCI, format 2C message, in values of two additional bits representing a determined use of CSI-RS resources.

The method may further comprise obtaining a division of the group into a preconfigured first part and a preconfigured second part, and sending to a wireless device an indication whether the first part, the second part or the group of all available aperiodic CSI-RS resources is used in a given subframe, thereby enabling a wireless device to rate match PDSCH. The first part may be a first half and the second part may be a second half.

A set of aperiodic ZP CSI-RS configurations in the wireless device may consist of resources that overlap with the aperiodic CSI-RS resource pool.

The indication may further represent that no aperiodic CSI-RS resource is used.

The two additional bits may represent four states in values 00, 01, 10, 11.

According to a second aspect there is presented a method for facilitating PDSCH rate matching. The method is performed in a wireless device and comprises receiving from a network node an indication whether a group of all available resources of an aperiodic CSI-RS resource pool is used in a given subframe, and applying PDSCH rate matching around aperiodic CSI-RS resources in the group indicated by the received indication. The receiving may comprise receiving, from a network node in transmission mode 9, a DCI format 2C message, in values of two additional bits representing a determined use of CSI-RS resources.

The method may further comprise receiving from the network node an indication whether a preconfigured first part, a preconfigured second part or the group of all available aperiodic CSI-RS resources is used in a given subframe, and applying PDSCH rate matching around CSI-RS resources in the preconfigured first part, the preconfigured second part or the group of all available resources indicated by the received indication. The first part may be a first half and the second part may be a second half.

A set of aperiodic ZP CSI-RS configurations in the wireless device may consists of resources that overlap with the aperiodic CSI-RS resource pool.

The two additional bits may represent four states in values 00, 01, 10, 11.

According to a third aspect there is presented a network node for facilitating PDSCH rate matching. The network node comprises a processor, and a computer program product storing instructions that, when executed by the processor, causes the network node to send an indication whether a group of all available resources of an aperiodic CSI-RS resource pool is used in a given subframe to a wireless device. The sending may comprise transmitting, to a wireless device in transmission mode 9, a DCI format 2C message, in values of two additional bits representing a determined use of CSI-RS resources.

According to a fourth aspect there is presented a wireless device for PDSCH rate matching. The wireless device comprises a processor, and a computer program product storing instructions that, when executed by the processor, causes the wireless device to receive from a network node an indication whether a group of all available resources of an aperiodic CSI-RS resource pool is used in a given subframe, and to PDSCH rate match on the group indicated by the received indication. The receiving may comprise receiving, from a network node in transmission mode 9, a Downlink Control Information, DCI, format 2C message, in values of two additional bits representing a determined use of CSI-RS resources.

According to a fifth aspect there is presented a network node for facilitating PDSCH rate matching. The network node comprises a communication manager for sending to a wireless device an indication whether a group of all available resources of an aperiodic CSI-RS resource pool is used in a given subframe. The sending may comprise transmitting, to a wireless device in transmission mode 9, a DCI format 2C message, in values of two additional bits representing a determined use of CSI-RS resources.

According to a sixth aspect there is presented a wireless device for facilitating PDSCH rate matching. The wireless device comprises a communication manager for receiving from a network node an indication whether a group of all available resources of an aperiodic CSI-RS resource pool is used in a given subframe, and a determination manager for applying PDSCH rate matching around aperiodic resources in the group indicated by the received indication. The receiving may comprise receiving, from a network node in transmission mode 9, a Downlink Control Information, DCI, format 2C message, in values of two additional bits representing a determined use of CSI-RS resources.

According to a seventh aspect there is presented a computer program for facilitating PDSCH rate matching. The computer program comprises computer program code which, when run on a network node, causes the network node to send to a wireless device an indication whether a group of all available resources of an aperiodic CSI-RS resource pool is used in a given subframe. The sending may comprises transmitting, to a wireless device in transmission mode 9, a DCI format 2C message, in values of two additional bits representing a determined use of CSI-RS resources.

According to an eighth aspect there is presented a computer program for facilitating PDSCH rate matching. The computer program comprises computer program code which, when run on a wireless device, causes the wireless device to receive from a network node an indication whether a group of all available resources of an aperiodic CSI-RS resource pool is used in a given subframe, and to apply PDSCH rate match around aperiodic resources in the group indicated by the received indication. The receiving may comprise receiving, from a network node in transmission mode 9, a Downlink Control Information, DCI, format 2C message, in values of two additional bits representing a determined use of CSI-RS resources.

According to a ninth aspect there is presented a computer program product comprising a computer program and a computer readable storage means on which the computer program is stored.

According to a tenth aspect there is presented a method for facilitating PDSCH rate matching. The method is performed in a network node and comprises sending to a wireless device an indication of available resources of an aperiodic CSI-RS resource pool, the indication identifying resources containing CSI-RS and resources not containing PDSCH. The sending may comprise transmitting, to a wireless device in transmission mode 9, a DCI format 2C message, in values of two additional bits representing a determined use of CSI-RS resources.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, on which.

DETAILED DESCRIPTION

Figure 1:
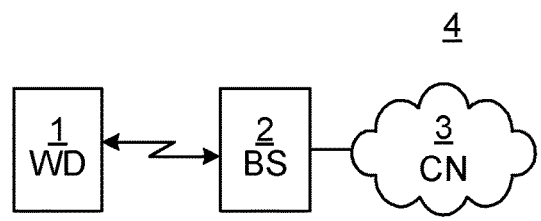
FIG. 1 is a schematic diagram illustrating an environment where embodiments presented herein can be applied.
Figure 2:
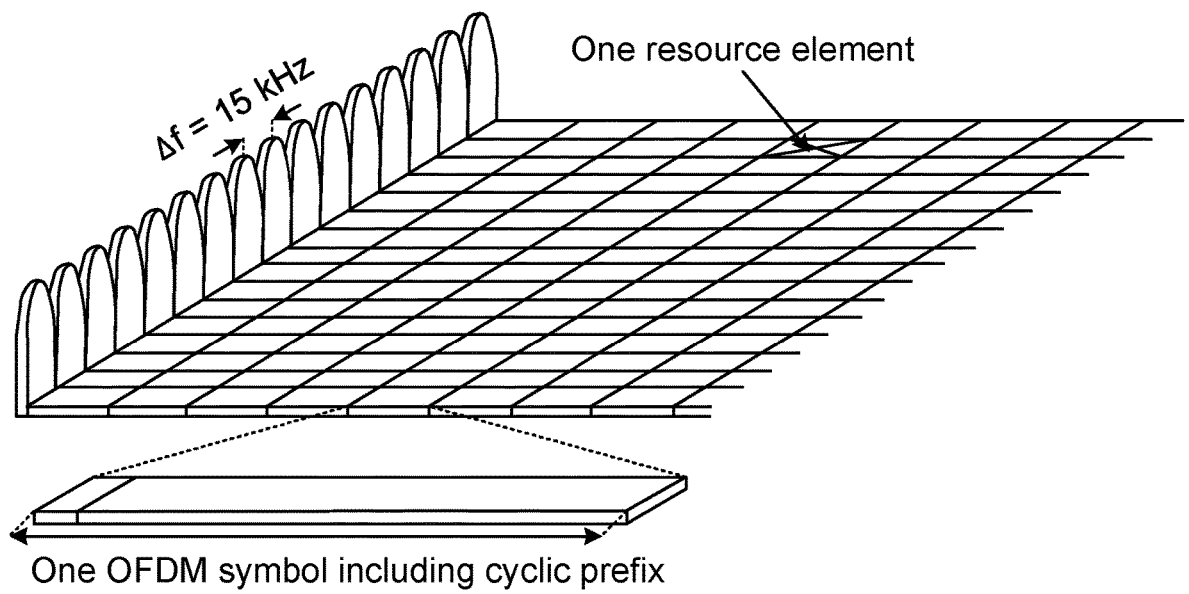
FIG. 2 is a schematic diagram illustrating a LTE downlink physical resource.
Figure 3:
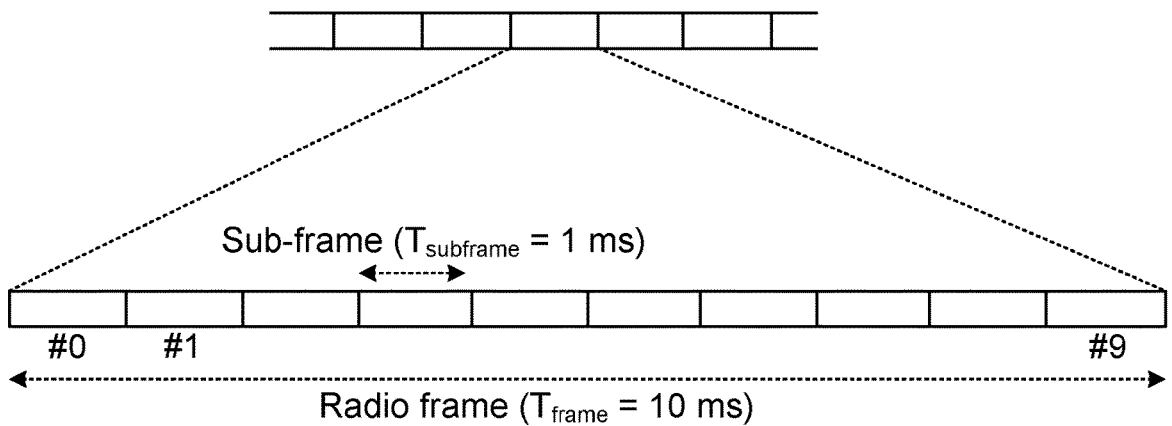
FIG. 3 is a schematic diagram illustrating a LTE time-domain structure.
Figure 4:
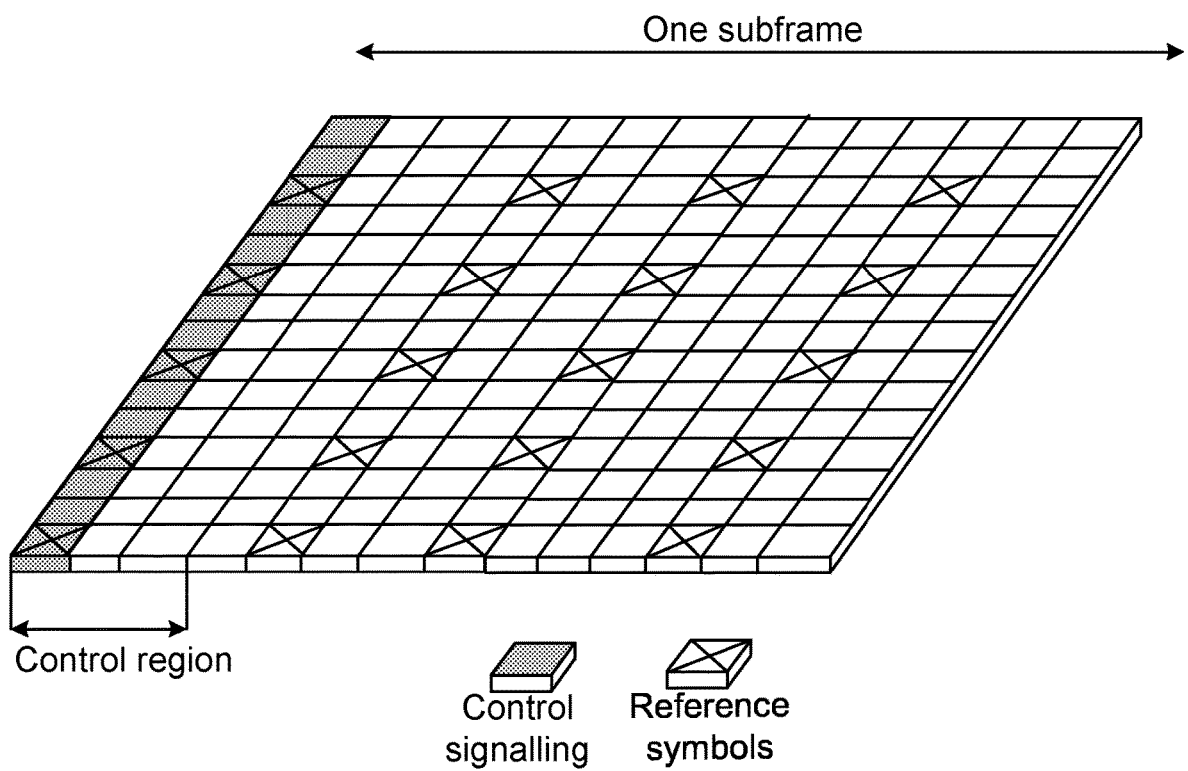
FIG. 4 is a schematic diagram illustrating a downlink subframe.
Figure 5:
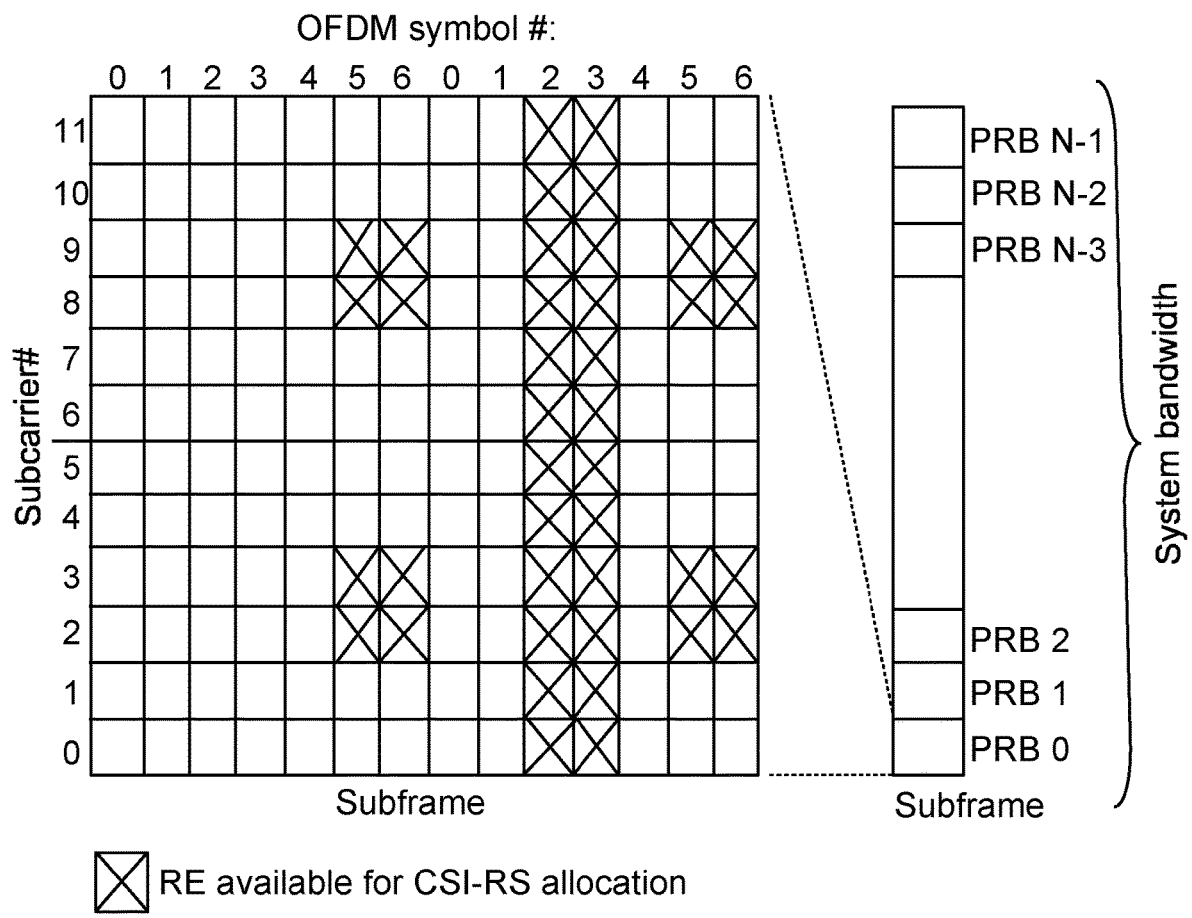
FIG. 5 is a schematic diagram illustrating resources available for CSI-RS allocation in a PRB in a CSI-RS subframe.
Figure 6:
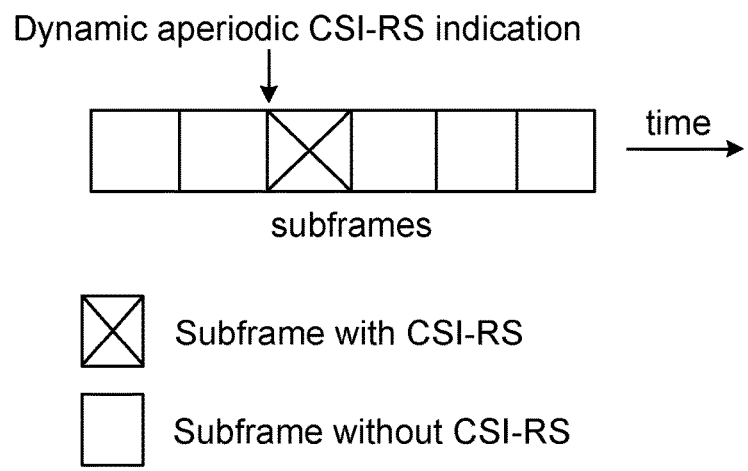
FIG. 6 is a schematic diagram illustrating an aperiodic CSI-RS transmission.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Note that although terminology from 3GPP LTE has been used in this disclosure to exemplify the invention, this should not be seen as limiting the scope of the invention to only the aforementioned system. Other wireless systems, including Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Also note that terminology such as eNodeB and UE should be considering non-limiting and does in particular not imply a certain hierarchical relation between the two; in general "eNodeB" could be considered as a first device and "UE" a second device, and these two devices communicate with each other over some radio channel. Herein, we also focus on wireless transmissions in the downlink, but the invention is equally applicable in the uplink.

In order to improve aperiodic Channel State Information Reference Signal (CSI-RS) resource efficiency while at the same time reducing average CSI triggering delay (see R1-167637, "UE specific Beamforming with Aperiodic CSI-RS Transmission", Ericsson, 3GPP TSG-RAN WG1 #86, Gothenburg, Sweden, Aug. 22-26, 2016, for details), the K aperiodic CSI-RS resources need to be dynamically shared among multiple UEs.

Let us now assume that K' out of the K aperiodic CSI-RS resources are used to trigger aperiodic CSI-RS transmission to K' UEs in a cell in a given subframe n. Then, for those UEs receiving data (i.e., PDSCH) transmission and not receiving aperiodic CSI-RS in subframe n, one of the approaches for Physical Downlink Shared Channel (PDSCH) rate matching is to dynamically indicate the set of K' aperiodic CSI-RS resources being used in subframe n. Then, these UEs can rate match PDSCH around the K' aperiodic CSI-RS resources being used in subframe n. One of the disadvantages of this approach is that the number of K' aperiodic CSI-RS combinations out of the K resources can be large. The number of K' aperiodic CSI-RS combinations out of K aperiodic CSI-RS resources for the case of K=8 is given in Table 2. In the table, nchoosek(K,K') denotes the different number of combinations for selecting K' resources out of K resources, commonly denoted $$\binom{K}{K'}.$$

TABLE 2

Number of K' aperiodic CSI-RS combinations out of K = 8 aperiodic CSI-RS resources

| Value of K' | Number of K' aperiodic CSI-RS combinations = nchoosek(K, K') |
|---|---|
| 1 | 8 |
| 2 | 28 |
| 3 | 56 |
| 4 | 70 |
| 5 | 56 |
| 6 | 28 |
| 7 | 8 |
| 8 | 1 |

Since the number K' of aperiodic CSI-RS resources being used in a given subframe n is not known to the UEs receiving PDSCH (and not receiving aperiodic CSI-RS transmissions in subframe n), $\log_2\{\text{nchoosek}(K,K)\}$ bits are needed to fully dynamically indicate which K' out of the K aperiodic CSI-RS resources are being used in subframe n. For instance, from Table 2, it is seen that the largest number of 70 combinations happens when K'=4. Hence, $\lceil \log_2\{70\} \rceil = 7$ bits are need to fully dynamically indicate which K' out of the K aperiodic CSI-RS resources are being used in subframe n. This amounts to a large increase in Downlink (DL) Control Information (DCI) overhead.

To fully dynamically indicate which K' out of the K aperiodic CSI-RS resources are being used in a given subframe for the purposes of PDSCH rate matching, log 2{nchoosek(K,K)} DL DCI bits are required.

For the case of K=8 aperiodic CSI-RS resources, 7 DL DCI bits are needed which amounts to a large increase in DL DCI overhead.

With regards to the alternatives identified in [Chairman's notes, 3GPP RAN #86, section 7.2.4.1.2, Aug. 22-26, 2016. Gothenburg, Sweden] and listed above, both Alternatives 1 and 2 will incur such large increase in DL DCI overhead.

For Alternative-2 where an aperiodic zero power (ZP) CSI-RS resource signalling field is introduced in DL DCIs for all TMs, the DL DCI overhead increase will impact all TMs. This results in an unwanted increase in DL DCI overhead especially in low to medium load conditions where aperiodic CSI-RS does not yield much CSI-RS overhead savings over periodic CSI-RS. To this end, Alternative-2 is not preferred.

Introducing an aperiodic ZP CSI-RS resource signalling field in DL DCIs for all TMs will result in unwanted increase in DL DCI overhead especially in low to medium load conditions where aperiodic CSI-RS does not yield much CSI-RS overhead savings over periodic CSI-RS.

For Alternative-1 where a new common DCI is monitored in the common search space, the number of blind decoding attempts in the common search space will increase for the UEs even in low to medium load conditions where aperiodic CSI-RS does not yield much CSI-RS overhead savings. In addition, in case of carrier aggregation, the common search space is only defined for transmissions on the primary component carrier and the new common DCI solution proposed in Alternative-1 for PDSCH rate matching can only be useful for the primary component carrier. Hence, Alternative-1 is not preferred due to its lack of suitability in the case of carrier aggregation and due to the increase in blind decoding attempts associated with it.

Dynamically indicating aperiodic ZP CSI-RS by a new common DCI results in increased number of blind detection attempts in the common search space and cannot be applied in all cases of carrier aggregation.

For Alternative-3, increasing the number of PQI states for TM10 is undesirable since this will increase the overhead associated with DCI format 2D. For instance, in the case of K=8 aperiodic NZP CSI-RS resources which requires 7 DL DCI bits as discussed above, an additional 5 bits need to be added to the PQI states to fully dynamically indicate which out of the K aperiodic CSI-RS resources are being used in a given subframe.

Increasing the number of PQI states for TM10 is undesirable for PDSCH rate matching resource indication since it will require an additional 5 bits to be added to DCI format 2D payload.

It should be noted that aperiodic CSI-RS are used to reduce CSI-RS overhead by sharing pools of CSI-RS among multiple UEs, where the CSI-RS is generally UE specific, and may vary on a subframe by subframe basis. This sharing by its nature minimizes the angles over which CSI-RS are transmitted, severely limiting the ability of UEs in neighbouring TPs to measure the channels to the TP transmitting aperiodic CSI-RS, and making aperiodic CSI-RS unsuitable for DPS. As a result, the use case for the application of aperiodic CSI-RS in DPS is limited. Hence, the existing PQI bits can be reused for other purposes. An option with Alternative 3 is to use the existing 2 PQI bits (i.e., 4 states) for PDSCH rate matching indication. However, it is a problem how to indicate the K' aperiodic CSI-RS resources being used in subframe n when the number of different combinations for selecting K' resources out of K resources is quite large.

In one solution, the existing PQI bits for transmission mode 10 are reused to indicate whether a first half, a second half, or the whole of the CSI-RS resource pool is used for aperiodic CSI-RS transmission in a given subframe for the purposes of PDSCH rate matching. A new 2 bit field is introduced for transmission mode 9.

In a second solution, one of the states in the existing PQI bits for transmission mode 10 are reused to indicate whether the whole of the CSI-RS resource pool is used for aperiodic CSI-RS transmission in a given subframe for the purposes of PDSCH rate matching. A new 1 bit field in introduced for transmission mode 9.

In a third solution, rate matching of PDSCH is done around the N activated resources in any subframe in case all the UEs served by an eNodeB are configured with the same pool of K aperiodic CSI-RS resource and all these UEs have the same N resources being activated The main advantages of the proposed solutions are that low control signaling overhead is ensured, and that no new DCI is needed.

Embodiment 1

From PDCCH overhead point of view, reuse of the existing four PQI states in DCI 2D for indicating the CSI-RS resources for PDSCH rate matching purpose is more desirable for UEs configured with transmission mode 10. However, there are only 2 PQI bits (thus 4 PQI states) available in DCI format 2D, so it is not possible to indicate all the possible aperiodic CSI-RS resource configurations in a subframe for a CSI-RS resource pool of more than 2 CSI-RS resources.

One solution is to divide the CSI-RS resource pool of K>1 aperiodic NZP CSI-RS resources configured into two groups. The first group contains the first $\lceil K/2 \rceil$ aperiodic NZP CSI-RS resources and the second group contains the last $K - \lceil K/2 \rceil$ aperiodic NZP CSI-RS resources. Then the four existing PQI states can be used to indicate PDSCH rate matching in a given subframe as follows:

state 0: no aperiodic CSI-RS transmission on any of the K resources.

state 1: at least one of the aperiodic CSI-RS resources in the first group is being used for aperiodic CSI-RS transmission.

state 2: at least one of the aperiodic CSI-RS resources in the second group is being used for aperiodic CSI-RS transmission.

state 3: both groups have at least one aperiodic CSI-RS resource being used for aperiodic CSI-RS transmission.

If at least one CSI-RS resource of the first group is being used for aperiodic CSI-RS transmission in a subframe, state 1 would be signaled to a UE with a PDSCH scheduled in the subframe. Then the UE will rate match PDSCH around the whole group of aperiodic CSI-RS resources, i.e. the UE assumes that the PDSCH is not mapped to the REs associated with the first group of CSI-RS resources. If both groups are being used for aperiodic CSI-RS transmission, state 3 would be signaled to a UE with a PDSCH scheduled in the subframe. Then the UE will rate match PDSCH around the whole pool of K aperiodic CSI-RS resources, i.e. the UE assumes that the PDSCH is not mapped to the REs associated with all the CSI-RS resources in the pool in the subframe.

Figure 7:
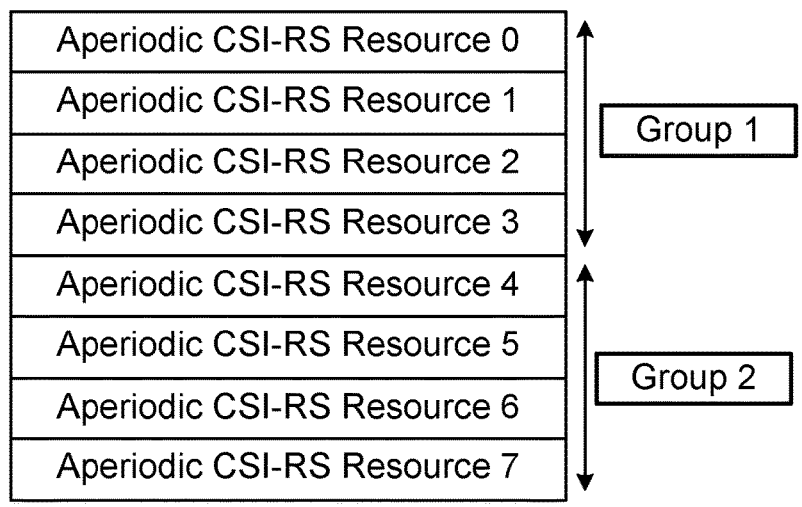
FIG. 7 shows an example of dynamic half pool resource indication approach with K=8.
Figure 8:
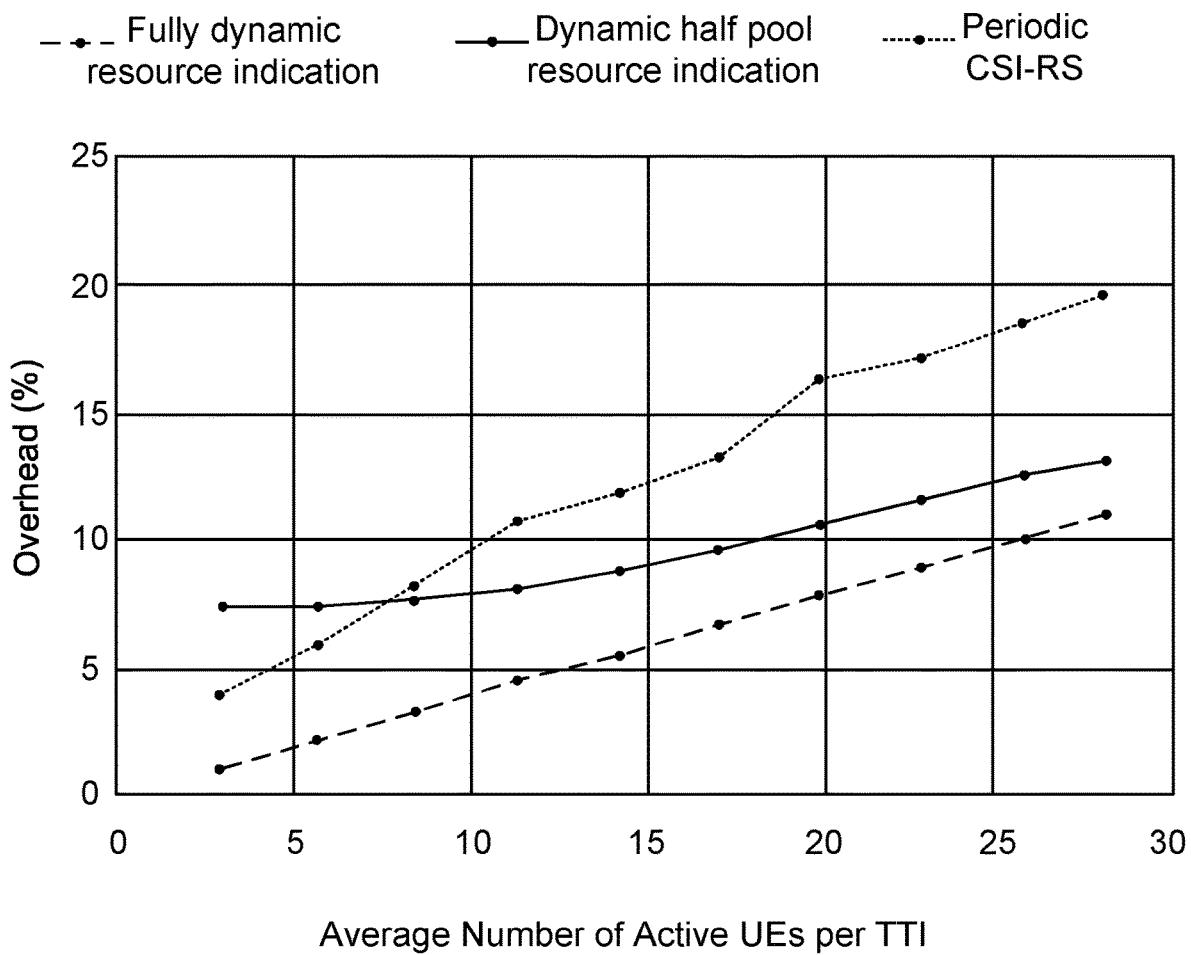
FIG. 8 is a schematic diagram illustrating overhead comparison between fully dynamic and dynamic half pool resource indication.

An example of such a dynamic half pool resource indication approach with K=8 is shown in FIG. 7.

For transmission mode 9, 2 additional bits may be added to existing DCI 2C for the same purpose, e.g. in values 00, 01, 10, 11. The four states of the two bits may be used to indicate PDSCH rate matching in a given subframe as follows:

state 0: no aperiodic CSI-RS transmission on any of the K resources.

state 1: at least one of the aperiodic CSI-RS resources in the first group is being used for aperiodic CSI-RS transmission.

state 2: at least one of the aperiodic CSI-RS resources in the second group is being used for aperiodic CSI-RS transmission.

state 3: both groups have at least one aperiodic CSI-RS resource being used for aperiodic CSI-RS transmission.

In one variant of the embodiment, UEs are configured with sets of ZP CSI-RS configurations with no subframe configuration associated with them (i.e., the ZP CSI-RS are aperiodic and can occur in any subframe). A first set of aperiodic ZP CSI-RS configurations consists of resources that overlap with the Aperiodic CSI-RS resources in the first group. A second set of aperiodic ZP CSI-RS configurations consists of resources that overlap with the Aperiodic CSI-RS resource in the second group. When State 1 is indicated, the UE rate matches PDSCH around the resources in the first set of aperiodic ZP CSI-RS configurations. When State 2 is indicated, the UE rate matches PDSCH around the resources in the second set of aperiodic ZP CSI-RS configurations. When State 3 is indicated, the UE rate matches PDSCH around the resources in both the first and second sets of aperiodic ZP CSI-RS configurations.

In the following, we compare the data overhead associated with fully dynamically indicating PDSCH rate matching information to that of the dynamic half pool resource indication approach described above. The fully dynamic indication of PDSCH rate matching information corresponds to Alternative-1, Alternative-2, and Alternative-3 with increased number of PQI states. The dynamic half pool resource indication approach corresponds to Alternative-3 with reusing the existing PQI states.

A comparison of the overhead associated with fully dynamically indicating PDSCH rate matching information to that of dynamic half pool resource indication approach for the case of K=8 is shown in FIG. 7. These results are generated using a FTP traffic model 1 with a packet size of 500 kilobytes and the average number of active UEs per TTI is shown in the abscissa. The overhead associated with the case when periodic CSI-RS is utilized is also shown for reference. Two ports per aperiodic CSI-RS is assumed.

Figure 9:
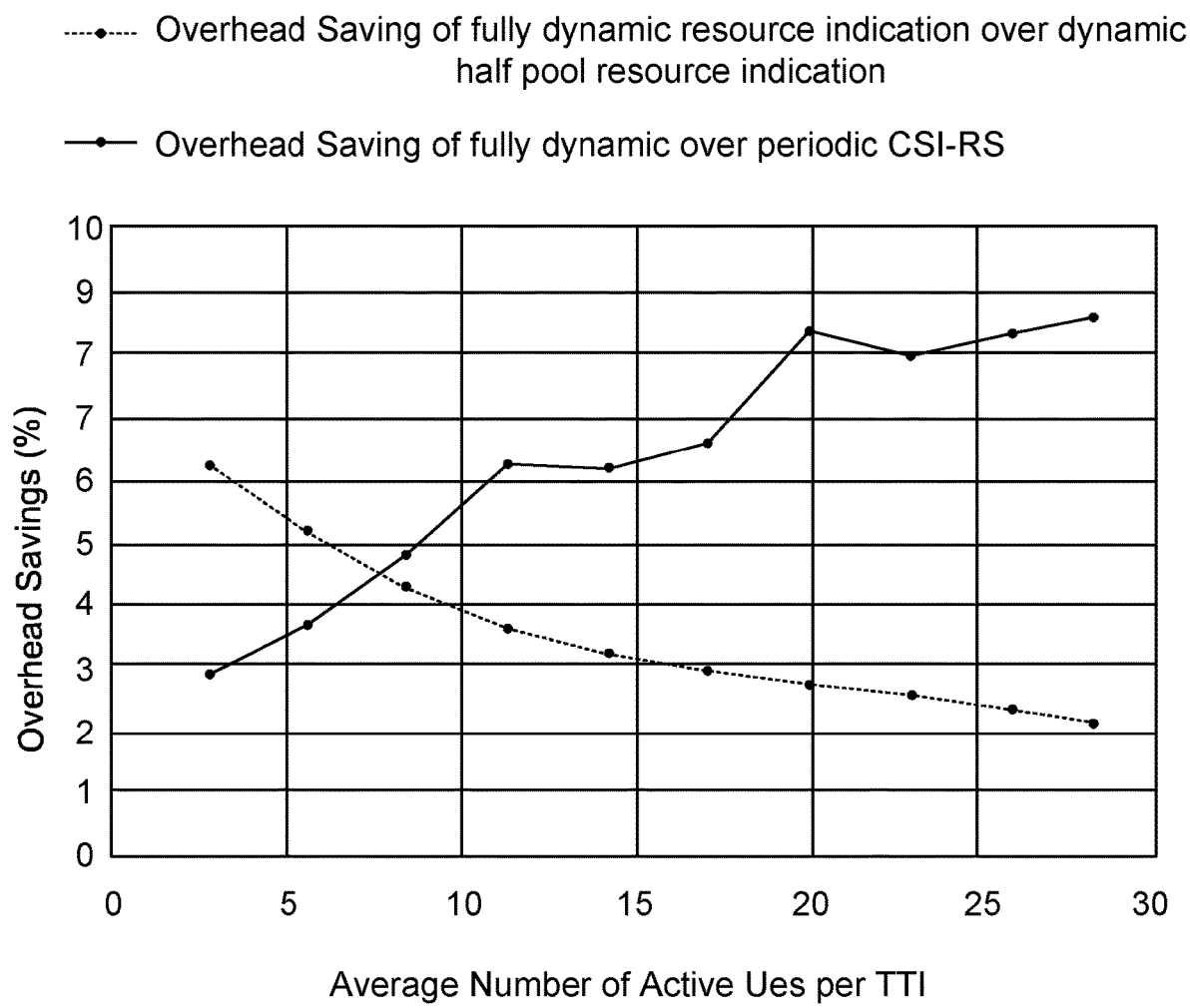
FIG. 9 is a schematic diagram illustrating overhead savings of fully dynamic resource indication.

From FIG. 9, it is evident that in the high load case (which is where the use of aperiodic CSI-RS provides meaningful overhead savings over the use of periodic CSI-RS), fully dynamic indication of PDSCH rate matching information achieves only about 2-4% overhead savings over dynamic half pool resource indication for PDSCH rate matching. The overhead savings of fully dynamic indication of PDSCH rate matching information over the cases of dynamic half pool resource indication and periodic CSI-RS are summarized in FIG. 9.

Given the small overhead savings of 2-4% achieved by fully dynamic resource indication over dynamic half pool resource indication, adding more bits to DCI is not justified. Hence, reusing of existing PQI states in DCI 2D combined with dynamic half pool resource indication for PDSCH rate matching is a more efficient solution.

Reusing the 4 PQI states in DCI format 2D for Transmission Mode 10 for the purpose of indicating whether or not a first half, a second half, or a whole of a preconfigured pool of aperiodic CSI-RS resources are being used in a given subframe so that a UE can rate match PDSCH around these resources.

Introducing 2 bits in DCI format 2C for Transmission Mode 9 for the purpose of indicating whether or not a first half, a second half, or a whole of a preconfigured pool of aperiodic CSI-RS resources are being used in a given subframe so that a UE can rate match PDSCH around these resources.

Configuring a UE with sets of aperiodic ZP CSI-RS configurations where a first set of aperiodic ZP CSI-RS configurations consists of resources that overlap with the Aperiodic CSI-RS resources in the first half of a preconfigured resource pool and a second set of aperiodic ZP CSI-RS configurations consists of resources that overlap with the Aperiodic CSI-RS resources in the first half of a preconfigured resource pool.

The UE performs PDSCH rate matching around one of the sets or both sets depending on the value indicated by the 2 bits (PQI bits for Transmission mode 10 and newly introduced bits for Transmission mode 9).

Embodiment 2

A second solution is to indicate if the whole CSI-RS resource pool of K>1 aperiodic NZP CSI-RS resources is being used for aperiodic CSI-RS transmission. That is if at least one UE is being triggered for aperiodic CSI-RS transmission using one of the resources in the resource pool of K>1 aperiodic NZP CSI-RS resources, then the UE receiving PDSCH (and not receiving aperiodic CSI-RS) is indicated to rate match PDSCH around the whole CSI-RS resource pool. Here, 1 bit is sufficient to indicate if the whole resource pool is being used or not. In some embodiments, for Transmission mode 10, one of the 4 PQI states could indicate that the whole pool is being used while the other 3 PQI states indicate that the whole pool is not being used. In some other embodiments, for transmission mode 9, a 1 bit field is introduced to indicate whether the whole pool is being used or not.

In one variant of the embodiment, UEs are configured with one set of ZP CSI-RS configurations with no subframe configuration associated with them (i.e., the ZP CSI-RS are aperiodic and can occur in any subframe). The set of aperiodic ZP CSI-RS configurations consists of resources that overlap with the Aperiodic CSI-RS resources in the whole preconfigured resource pool. If the UE receiving PDSCH is indicated that the whole pool is used, the UE rate matches PDSCH around the resources in the whole pool of aperiodic ZP CSI-RS configurations.

Using one of the 4 PQI states in DCI format 2D for Transmission Mode 10 for the purpose of indicating whether a whole of a preconfigured pool of aperiodic CSI-RS resources are being used in a given subframe so that a UE can rate match PDSCH around these resources in the whole pool.

Introducing 1 bit in DCI format 2C for Transmission Mode 9 for the purpose of indicating whether a whole of a preconfigured pool of aperiodic CSI-RS resources are being used in a given subframe so that a UE can rate match PDSCH around these resources in the whole pool.

Configuring a UE with a set of aperiodic ZP CSI-RS configurations where the set of aperiodic ZP CSI-RS configurations consists of resources that overlap with the Aperiodic CSI-RS resources in the whole preconfigured resource pool.

The UE performs PDSCH rate matching around whole pool of preconfigured aperiodic CSI-RS resources if it is indicated that the pool is being used.

Embodiment 3

If all the UEs served by an eNodeB are configured with the same pool of K aperiodic CSI-RS resource and all these UEs have the same N resources being activated, then the UE receiving PDSCH (which also has the same K resources preconfigured and the same N resources being activated) can readily rate match PDSCH around the resources in the N activated aperiodic CSI-RS resources. Such rate matching can take place in every subframe and PDSCH rate matching information does not have to be dynamically indicated to the UEs receiving PDSCH.

Rate matching of PDSCH is done around the N activated resources in any subframe in case all the UEs served by an eNodeB are configured with the same pool of K aperiodic CSI-RS resource and all these UEs have the same N resources being activated.

Embodiment 4

In this embodiment, different groups of UEs served by an eNodeB are preconfigured with different sets of aperiodic CSI-RS resources. Assuming there are G such groups of UEs, these UEs are preconfigured with $K_1, K_2, \ldots, K_G$ aperiodic CSI-RS resources where $K_g$ denotes the number aperiodic CSI-RS resources preconfigured to the $g^{th}$ group of UEs.

In this case the pools of aperiodic CSI-RS resources are grouped into 2 separate groups. The first group contains the resources $K_1, K_2, \ldots, K_{\lceil G/2 \rceil}$ and the second group contains the resources $K_{\lceil G/2 \rceil+1}, K_{\lceil G/2 \rceil+2}, \ldots, K_G$. Then the four existing PQI states can be used to indicate PDSCH rate matching in a given subframe as follows:

state 0: no aperiodic CSI-RS transmission on any of the resources in $K_1, K_2, \ldots, K_G$.

state 1: at least one of the aperiodic CSI-RS resources in the first group is being used for aperiodic CSI-RS transmission.

state 2: at least one of the aperiodic CSI-RS resources in the second group is being used for aperiodic CSI-RS transmission.

state 3: both groups have at least one aperiodic CSI-RS resource being used for aperiodic CSI-RS transmission.

For transmission mode 9, 2 additional bits may be added to existing DCI 2C for the same purpose.

In one variant of the embodiment, UEs are configured with sets of ZP CSI-RS configurations with no subframe configuration associated with them (i.e., the ZP CSI-RS are aperiodic and can occur in any subframe). A first set of aperiodic ZP CSI-RS configurations consists of resources that overlap with the Aperiodic CSI-RS resources in the first group. A second set of aperiodic ZP CSI-RS configurations consists of resources that overlap with the Aperiodic CSI-RS resource in the second group. When State 1 is indicated, the UE rate matches PDSCH around the resources in the first set of aperiodic ZP CSI-RS configurations. When State 2 is indicated, the UE rate matches PDSCH around the resources in the second set of aperiodic ZP CSI-RS configurations. When State 3 is indicated, the UE rate matches PDSCH around the resources in both the first and second sets of aperiodic ZP CSI-RS configurations.

A communication network 4, wherein embodiments described herein can be implemented is presented in FIG. 1. A wireless device (WD) 1 is wirelessly connectable to a base station (BS) 2. The BS 2 is connected to a core network (CN) 3.

Figure 10A:
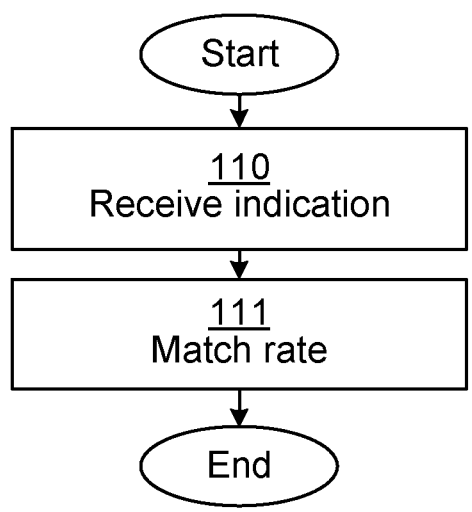
FIGS. 10A-10B are flow charts illustrating methods for embodiments presented herein.
Figure 10B:
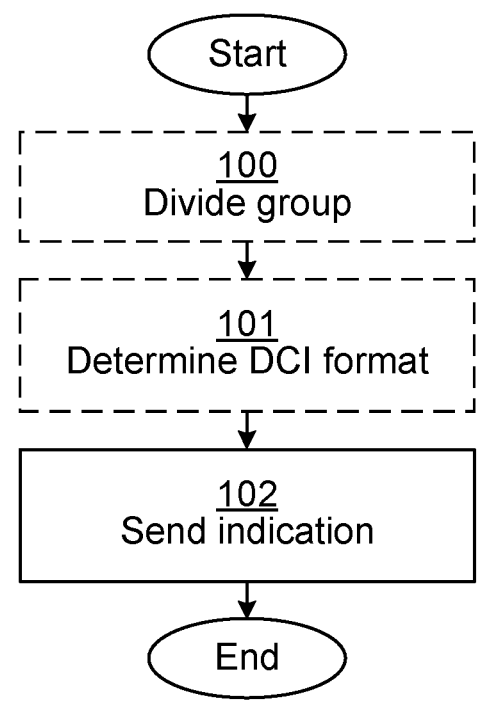

A method, according to an embodiment, for facilitating PDSCH rate matching is presented with reference to FIG. 10B. The method is performed in a network node 2 and comprises sending 102 to a wireless device 1 an indication whether a group of all available resources of an aperiodic CSI-RS resource pool is used in a given subframe. The sending 102 comprises transmitting, to a wireless device in transmission mode 9, a DCI format 2C message, in values of two additional bits representing a determined use of CSI-RS resources.

The method may further comprise obtaining a division 100 of the group into a preconfigured first part and a preconfigured second part, and sending 102 to a wireless device an indication whether the first part, the second part or the group of all available aperiodic CSI-RS resources is used in a given subframe, thereby enabling a wireless device to rate match PDSCH. The indication may represent that no aperiodic CSI-RS resource is used. The first part may be a first half and the second part may be a second half.

A set of aperiodic ZP CSI-RS configurations in the wireless device may consist of resources that overlap with the aperiodic CSI-RS resource pool.

The method may further comprise determining 101 to use one of the first half, the second half, the group of all available aperiodic CSI-RS resources and, if applicable, no aperiodic CSI-RS resource, and wherein the sending 102 comprises transmitting, to a wireless device in transmission mode 10, a DCI format 2D message in which values representing the determined use of CSI-RS resources is assigned to two PQI bits in the DCI format 2D message. By step 101, therefore, the number of additional DCI bits for rate matching may be determined. Alternatively, step 101 may be regarded as a determination of a DCI format to use.

The method may further comprise determining 101 whether the group of all available resources of the aperiodic CSI-RS resource pool or no aperiodic CSI-RS resources is used in the subframe, and wherein the sending 102 comprises transmitting, to a wireless device in transmission mode 10, a DCI format 2D message in which a value representing the determined use of CSI-RS resources is assigned to one PQI state in the DCI format 2D message.

The sending 102 may comprise transmitting, to a wireless device in transmission mode 9, a DCI format 2C message, in which one additional bit represents the indication.

The two additional bits may represent four states in values 00, 01, 10, 11.

A method according to an embodiment for facilitating PDSCH rate matching is presented with reference to FIG. 10A. The method is performed in a wireless device and comprises receiving 110 from a network node 2 an indication whether a group of all available resources of an aperiodic CSI-RS resource pool is used in a given subframe, and applying PDSCH rate matching 111 around aperiodic CSI-RS resources in the group indicated by the received indication. The method is implemented by a wireless device in transmission mode 9, wherein the indication is received in two bits in DCI format 2C. The receiving 110 comprises receiving, from a network node 2 in transmission mode 9, a DCI format 2C message, in values of two additional bits representing a determined use of CSI-RS resources The method may further comprise receiving 110 from the network node an indication whether a preconfigured first part, a preconfigured second part or the group of all available aperiodic CSI-RS resources is used in a given subframe, and applying PDSCH rate matching around aperiodic CSI-RS resources in the preconfigured first part, the preconfigured second part or the group of all available resources indicated by the received indication. The first part may be a first half and the second part may be a second half.

The method may be implemented by a wireless device in transmission mode 10, wherein the indication may be received in two PQI bits in DCI format 2D.

The method may be implemented by a wireless device in transmission mode 10, wherein the indication may be received in one PQI bit in DCI format 2D.

The method may be implemented by a wireless device in transmission mode 9, wherein the indication may be received in one bit in DCI format 2C.

Implementations Embodiments 1-4)

Figure 11A:
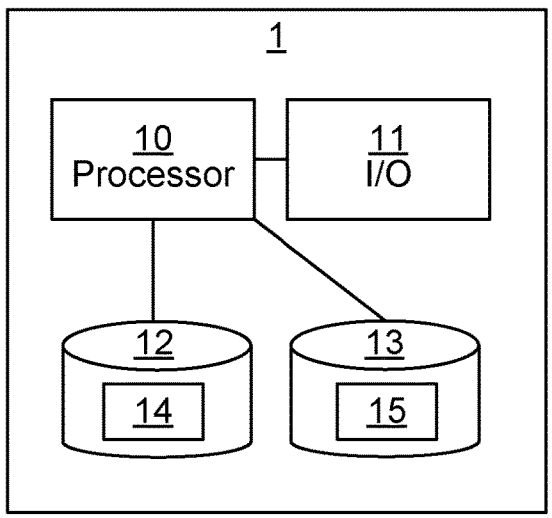
FIGS. 11A-11 are schematic diagrams illustrating some components of devices presented herein.
Figure 11B:
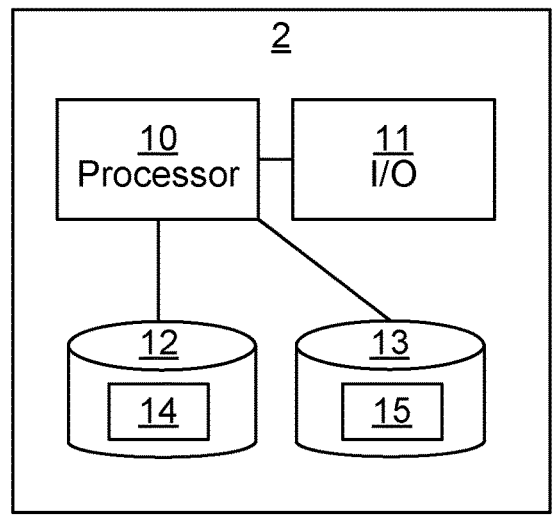

A network node 2, according to an embodiment, for facilitating PDSCH rate matching is presented with reference to FIG. 11B. The network node 2 comprises a processor 10, and a computer program product 12, 13. The computer program product stores instructions that, when executed by the processor, causes the network node to send 102 to a wireless device 1 an indication whether a group of all available resources of an aperiodic CSI-RS resource pool is used in a given subframe. The send 102 comprises transmit, to a wireless device in transmission mode 9, a Downlink Control Information, DCI, format 2C message, in values of two additional bits representing a determined use of CSI-RS resources.

A wireless device 1, according to an embodiment for facilitating PDSCH rate matching is presented with reference to FIG. 11A. The wireless device 1 comprises a processor 10 and a computer program product 12, 13. The computer program product stores instructions that, when executed by the processor, causes the wireless device 1 to receive 110 from a network node 2 an indication whether a group of all available resources of an aperiodic CSI-RS resource pool is used in a given subframe, and to apply PDSCH rate match 111 around aperiodic resources in the group indicated by the received indication. The receive 110 comprises receive, from a network node 2 in transmission mode 9, a Downlink Control Information, DCI, format 2C message, in values of two additional bits representing a determined use of CSI-RS resources.

Figure 12A:
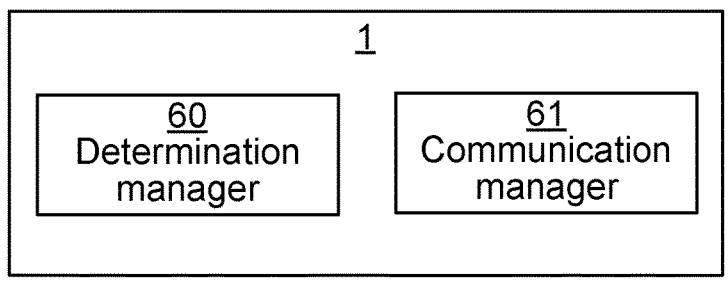
FIGS. 12A-12B are schematic diagrams showing functional modules of devices presented herein.
Figure 12B:
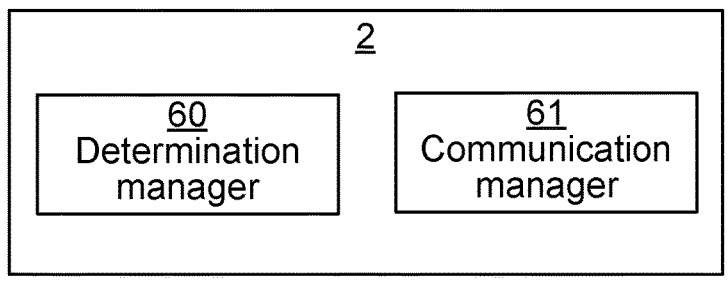

A network node 2, according to an embodiment, for facilitating PDSCH rate matching is presented with reference to FIG. 12B. The network node 2 comprises a communication manager 61 for sending 102 to a wireless device 1 an indication whether a group of all available resources of an aperiodic CSI-RS resource pool is used in a given subframe. The sending 102 comprises transmitting, to a wireless device in transmission mode 9, a Downlink Control Information, DCI, format 2C message, in values of two additional bits representing a determined use of CSI-RS resources.

A wireless device 1, according to an embodiment, for facilitating PDSCH rate matching is presented with reference to FIG. 12A. The wireless device 1 comprises a communication manager 61 for receiving 110 from a network node 2 an indication whether a group of all available resources of an aperiodic CSI-RS resource pool is used in a given subframe, and a determination manager 60 for applying PDSCH rate matching 111 around aperiodic resources in the group indicated by the received indication. The receiving 110 comprises receiving, from a network node 2 in transmission mode 9, a Downlink Control Information, DCI, format 2C message, in values of two additional bits representing a determined use of CSI-RS resources.

A computer program 14, 15, according to an embodiment, for facilitating PDSCH rate matching is presented. The computer program comprises computer program code which, when run on a network node 2, causes the network node 2 to send 102 to a wireless device 1 an indication whether a group of all available resources of an aperiodic CSI-RS resource pool is used in a given subframe. The send 102 comprises transmit, to a wireless device in transmission mode 9, a Downlink Control Information, DCI, format 2C message, in values of two additional bits representing a determined use of CSI-RS resources.

A computer program 14, 15, according to an embodiment, for facilitating PDSCH rate matching is presented. The computer program comprises computer program code which, when run on a wireless device 1, causes the wireless device 1 to receive 110 from a network node 2 an indication whether a group of all available resources of an aperiodic CSI-RS resource pool is used in a given subframe, and to apply PDSCH rate match 111 around aperiodic resources in the group indicated by the received indication. The receive 110 comprises receive, from a network node 2 in transmission mode 9, a Downlink Control Information, DCI, format 2C message, in values of two additional bits representing a determined use of CSI-RS resources.

A computer program product 12, 13 comprising a computer program 14, 15 and a computer readable storage means on which the computer program 14, 15 is stored is also presented.

FIG. 11A is a schematic diagram showing some components of the wireless device 1. A processor 10 may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor 10 may be configured to execute methods described herein with reference to FIG. 10A.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the WD 1.

The WD 1 may further comprise an input/output, I/O, interface 11 including e.g. a user interface. The WD 1 may further comprise a receiver configured to receive signalling from other nodes, and a transmitter configured to transmit signalling to other nodes (not illustrated). Other components of the WD 1 are omitted in order not to obscure the concepts presented herein.

FIG. 12A is a schematic diagram showing functional blocks of the WD 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 10A, comprising a determination manager unit 60 and a communication manager unit 61. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manger 60 is for PDSCH rate matching. This module corresponds to the match step 111 of FIG. 10A. This module can e.g. be implemented by the processor 10 of FIG. 11A, when running the computer program.

The communication manger 61 is for PDSCH rate matching. This module corresponds to the receive step no of FIG. 10A. This module can e.g. be implemented by the processor 10 of FIG. 11A, when running the computer program.

FIG. 11B is a schematic diagram showing some components of the base station 2. A processor 10 may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor 10 may be configured to execute methods described herein with reference to FIG. 10B.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the BS 2.

The BS 2 may further comprise an input/output, I/O, interface 11 including e.g. a user interface. The BS 2 may further comprise a receiver configured to receive signalling from other nodes, and a transmitter configured to transmit signalling to other nodes (not illustrated). Other components of the BS 2 are omitted in order not to obscure the concepts presented herein.

FIG. 12B is a schematic diagram showing functional blocks of the BS 2. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 10B, comprising a determination manager unit 60 and a communication manager unit 61. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manger 60 is for PDSCH rate matching. This module corresponds to the divide step 100 and the determine step 101 of FIG. 10B. This module can e.g. be implemented by the processor 10 of FIG. 11B, when running the computer program.

The communication manger 61 is for PDSCH rate matching. This module corresponds to the send step 102 of FIG. 10B. This module can e.g. be implemented by the processor 10 of FIG. 11B, when running the computer program.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for facilitating Physical Downlink Shared Channel (PDSCH) rate matching, the method being performed in a network node and comprising:
sending, to a wireless device, an indication whether a group of all available resources of one or more aperiodic Channel State Information Reference Signal (CSI-RS) resource pools is used in a given subframe, wherein each aperiodic CSI-RS is user-equipment-specific, wherein sending the indication comprises transmitting, to a wireless device in transmission mode 9, a Downlink Control Information (DCI) format 2C message, in values of two additional bits representing a determined use of CSI-RS resources of the one or more aperiodic CSI-RS resource pools;
obtaining a division of the one or more aperiodic CSI-RS resource pools into a preconfigured first part and a preconfigured second part, wherein the first part is distinct from the second part; and
sending to the wireless device an indication whether the first part, the second part, or the one or more pools of all available aperiodic CSI-RS resources is used in a given subframe, thereby enabling a wireless device to rate match PDSCH.

2. The method of claim 1, wherein a set of aperiodic zero power (ZP) CSI-RS configurations in the wireless device consists of resources that overlap with the aperiodic CSI-RS resource pool.

3. The method of claim 1, wherein the indication represents that no aperiodic CSI-RS resource is used.

4. The method of claim 1, wherein the two additional bits represents four states in values 00, 01, 10, 11.

5. A method for facilitating Physical Downlink Shared Channel (PDSCH) rate matching, the method being performed in a wireless device and comprising:
  receiving, from a network node, an indication of whether a group of all available resources of one or more aperiodic Channel State Information Reference Signal (CSI-RS) resource pools is used in a given subframe, wherein each aperiodic CSI-RS is user-equipment-specific, and wherein receiving the indication comprises receiving, from a network node in transmission mode 9, a Downlink Control Information (DCI) format 2C message, in values of two additional bits representing a determined use of CSI-RS resources of the one or more aperiodic CSI-RS resource pools;
  applying PDSCH rate matching around aperiodic CSI-RS resources in the group indicated by the received indication; and
  receiving, from the network node, an indication of whether a preconfigured first part, a preconfigured second part or the one or more pools of all available aperiodic CSI-RS resources is used in a given subframe, wherein the first part is distinct from the second part; and
  applying PDSCH rate matching the preconfigured first part, the preconfigured second part or the one or more pools of all available resources indicated by the received indication.

6. The method of claim 5, wherein a set of aperiodic zero power (ZP) CSI-RS configurations in the wireless device consists of resources that overlap with the aperiodic CSI-RS resource pool.

7. The method of claim 5, wherein the two additional bits represents four states in values 00, 01, 10, 11.

8. A network node for facilitating Physical Downlink Shared Channel (PDSCH) rate matching, the network node comprising:
  a processor; and
  a computer program product storing instructions that, when executed by the processor, cause the network node to:
    send, to a wireless device, an indication of whether a group of all available resources of one or more aperiodic Channel State Information Reference Signal (CSI-RS) resource pools is used in a given subframe, wherein each aperiodic CSI-RS is user-equipment-specific, wherein sending the indication comprises transmitting, to a wireless device in transmission mode 9, a Downlink Control Information (DCI) format 2C message, in values of two additional bits representing a determined use of CSI-RS resources of the one or more aperiodic CSI-RS resource pools;
    obtain a division of the one or more aperiodic CSI-RS resource pools into a preconfigured first part and a preconfigured second part, wherein the first part is distinct from the second part; and
    send to a wireless device an indication of whether the first part, the second part, or the one or more pools of all available aperiodic CSI-RS resources is used in a given subframe, thereby enabling a wireless device to rate match PDSCH.

9. The network node of claim 8, wherein a set of aperiodic zero power (ZP) CSI-RS configurations in the wireless device consists of resources that overlap with the aperiodic CSI-RS resource pool.

10. The network node of claim 8, wherein the indication further represents that no aperiodic CSI-RS resource is used.

11. The network node of claim 8, wherein the two additional bits represents four states in values 00, 01, 10, 11.

12. A wireless device for facilitating Physical Downlink Shared Channel (PDSCH) rate matching, the wireless device comprising:
  a processor; and
  a computer program product storing instructions that, when executed by the processor, cause the wireless device to:
    receive, from a network node, an indication of whether a group of all available resources of one or more aperiodic Channel State Information Reference Signal (CSI-RS) resource pools is used in a given subframe, wherein each aperiodic CSI-RS is user-equipment-specific, and wherein receiving the indication comprises receiving, from a network node in transmission mode 9, a Downlink Control Information (DCI) format 2C message, in values of two additional bits representing a determined use of CSI-RS resources of the one or more aperiodic CSI-RS resource pools;
    apply PDSCH rate match around aperiodic resources in the group indicated by the received indication;
    receive an indication of whether a preconfigured first part, a preconfigured second part or the one or more pools of all available aperiodic CSI-RS resources is used in a given subframe from the network node, wherein the first part is distinct from the second part; and
    apply PDSCH rate match around aperiodic CSI-RS resources in the preconfigured first part, the preconfigured second part or the one or more pools of all available resources indicated by the received indication.

13. The wireless device of claim 12, wherein a set of aperiodic zero power (ZP) CSI-RS configurations in the wireless device consists of resources that overlap with the aperiodic CSI-RS resource pool.

14. The wireless device of claim 12, wherein the two additional bits represents four states in values 00, 01, 10, 11.

15. A non-transitory computer-readable medium comprising, stored thereupon, a computer program for facilitating Physical Downlink Shared Channel (PDSCH) rate matching, the computer program comprising computer program code which, when run on a network node, causes the network node to:
  send, to a wireless device, an indication of whether a group of all available resources of one or more aperiodic Channel State Information Reference Signal (CSI-RS) resource pools is used in a given subframe, wherein each of the one or more CSI-RS resource pools is user-equipment-specifically configured, and wherein sending the indication comprises transmitting, to a wireless device in transmission mode 9, a Downlink Control Information (DCI) format 2C message, in values of two additional bits representing a determined use of CSI-RS resources of the one or more aperiodic CSI-RS resource pools;
  obtain a division of the one or more aperiodic CSI-RS resource pools into a preconfigured first part and a preconfigured second part, wherein the first part is distinct from the second part; and
  send to a wireless device an indication of whether the first part, the second part, or the one or more pools of all available aperiodic CSI-RS resources is used in a given subframe, thereby enabling a wireless device to rate match PDSCH.

16. A non-transitory computer-readable medium comprising, stored thereupon, a computer program for facilitating Physical Downlink Shared Channel (PDSCH) rate matching, the computer program comprising computer program code which, when run on a wireless device, causes the wireless device to:
- receive, from a network node, an indication of whether a group of all available resources of one or more aperiodic Channel State Information Reference Signal (CSI-RS) resource pools is used in a given subframe, wherein each of the one or more CSI-RS resource pools is user-equipment-specifically configured, and wherein receiving the indication comprises receiving, from a network node in transmission mode 9, a Downlink Control Information (DCI) format 2C message, in values of two additional bits representing a determined use of CSI-RS resources of the one or more aperiodic CSI-RS resource pools;
- apply PDSCH rate match around aperiodic resources in the group indicated by the received indication;
- receive an indication of whether a preconfigured first part, a preconfigured second part or the one or more pools of all available aperiodic CSI-RS resources is used in a given subframe from the network node, wherein the first part is distinct from the second part; and
- apply PDSCH rate match around aperiodic CSI-RS resources in the preconfigured first part, the preconfigured second part or the one or more pools of all available resources indicated by the received indication.

* * * * *